United States Patent [19]
Miller et al.

[11] Patent Number: 5,925,233
[45] Date of Patent: Jul. 20, 1999

[54] USE OF ALKANESULFONIC ACIDS AS ASPHALTENE-DISPERSING AGENTS

[75] Inventors: Dennis Miller, Kelkheim; Axel Vollmer, Kriftel; Michael Feustel, Köngernheim, all of Germany

[73] Assignee: Clariant GmbH, Frankfurt, Germany

[21] Appl. No.: 08/950,033

[22] Filed: Oct. 14, 1997

[30] Foreign Application Priority Data

Oct. 15, 1996 [DE] Germany ............. 196 42 493

[51] Int. Cl.$^6$ ..................................... C07C 7/20
[52] U.S. Cl. ............. 208/48 AA; 208/265; 208/282; 585/2; 44/281; 44/370; 508/390; 508/403; 508/567
[58] Field of Search .............. 208/48 AA, 265, 208/282; 585/2; 44/281, 370; 508/390, 403, 567

[56] References Cited

U.S. PATENT DOCUMENTS

| | | | |
|---|---|---|---|
| 2,639,227 | 5/1953 | Glendenning et al. | 44/370 |
| 3,105,810 | 10/1963 | Miller et al. | 208/48 AA |
| 4,182,613 | 1/1980 | Stover et al. | 44/51 |
| 4,414,035 | 11/1983 | Newberry et al. | 134/3 |
| 4,425,223 | 1/1984 | Miller | 208/48 AA |
| 4,441,890 | 4/1984 | Feldman | 44/370 |
| 4,902,824 | 2/1990 | Syrinek | 560/248 |
| 5,421,993 | 6/1995 | Hille et al. | 208/47 |

FOREIGN PATENT DOCUMENTS

| | | |
|---|---|---|
| 2029465 | 5/1991 | Canada . |
| 2075749 | 2/1993 | Canada . |
| 2372225 | 7/1978 | France . |
| 1246545 | 9/1971 | United Kingdom . |

OTHER PUBLICATIONS

J. Pet. Technol. 47 (1995) 782–787 Sep. 1995.
D.–L., Chang and H. S. Fogler (SPE paper No. 25185, 1993) Mar. 1993.
Derwent Patent Family Report (no month available).

*Primary Examiner*—Walter D. Griffin
*Attorney, Agent, or Firm*—Miles B. Dearth

[57] ABSTRACT

The present invention relates to the use of secondary alkanesulphonic acids as asphaltene dispersing agent in crude oils and products derived therefrom, wherein a chain length of 8 to 22 C atoms is present. The secondary alkanesulfonic acids are employed in an amount of from 1 to 10,000 ppm by volume. The alkanesulfonic acid is preferably formulated as a solution or microemulsion, and can further contain optional alkyl-formaldehyde resin, oxyalkylated amines, or wax-dispersing agents. The alkanesulfonic acids provide reduced precipitate amounts, slow the rate of precipitate formation, form a more finely divided precipitate and reduce the tendency of the precipitate to be deposited on surfaces.

9 Claims, No Drawings

USE OF ALKANESULFONIC ACIDS AS ASPHALTENE-DISPERSING AGENTS

Asphaltenes are constituents of crude oils. They comprise a large number of structures, in particular high molecular weight fused aromatic components with heteroatoms. In view of the complexity of their chemistry, asphaltenes are described as the oil fraction which is soluble in benzene but not in n-pentane.

In crude oil, asphaltenes are usually present as a colloidal dispersion. This is stabilized by oil resins.

Asphaltenes can precipitate out during production, refining, transportation and storage of crude oil and products derived therefrom, such as, for example, heavy heating oil or marine oil. Common causes of this precipitation are a reduction in the temperature or a change in the composition (for example evaporation of readily volatile constituents). Asphaltenes can also precipitate out on flowing through porous media. Flooding with $CO_2$ during the extraction process can make asphaltenes flocculate or precipitate out.

Some oils comprise hydrocarbon waxes which precipitate out at low temperatures. Interactions between the precipitating out of wax and asphaltenes can increase the total amount of substance precipitated out or the rate of formation thereof.

Asphaltenes which have precipitated out cause problems during production and during processing of crude oils. Asphaltenes are precipitated in valves, pipes and conveying devices. On hot surfaces, such as, for example, heat exchangers, carbonization of these precipitates can make their removal very difficult. The precipitates reduce the efficiency of plants and in the worst case can lead to a complete blockage and to a stop in production, which results in high costs.

Heavy oils, which are often used for powering ships, comprise considerable amounts of asphaltenes. Precipitating out of asphaltenes can lead both to poor combustion and to difficulties during handling and storage of the fuel. Combustion disturbances due to precipitating out of asphaltenes are also observed in power stations operated with heavy oils.

Bitumen, heavy oils and residues are sometimes diluted with solvents to reduce the viscosity for transportation. If asphaltenes precipitate out here, then there are problems during handling.

Precipitating out of asphaltenes can be prevented or reduced by small amounts of dispersing agents. These substances show one or more of the following effects:
a) the amount of precipitate is reduced;
b) the precipitate forms more slowly;
c) the precipitate is more finely divided; and
d) the tendency of the precipitate to be deposited on surfaces is reduced.

If precipitates of asphaltenes have already formed, they can be removed by using solvents. The addition of a dispersing agent can improve the effectiveness of these solvents.

A large number of asphaltene-dispersing agents are already known. CA 2 029 465 and CA 2 075 749 describe alkylphenol-formaldehyde resins in combination with hydrophilic-lipophilic vinyl polymers. The asphaltene-dispersing properties of dodecylbenzenesulfonic acid have been described in U.S. Pat. No. 4 414 035, and also by D.-L. Chang and H. S. Fogler (SPE paper No. 25185, 1993) and by M. N. Bouts et al. (J. pet. Technol. 47, 782–7, 1995). Oxalkylated amines are described in U.S. Pat. No. 5 421 993.

The dispersing agents known to date can only partly solve the problems caused by precipitating out of asphaltenes. Since oils vary in their composition, individual dispersing agents can operate effectively only in a limited range. Sometimes even small changes in the oil composition have a major effect on the dispersing properties for asphaltenes. In some cases, the known dispersing agents are therefore not satisfactory and additional types are necessary.

There was therefore the object of providing novel asphaltene-dispersing agents which do not have the disadvantages described for the dispersing agents known to date.

Surprisingly, it has been found that secondary alkanesulfonic acids having chain lengths of $C_8$–$C_{22}$, preferably $C_{11}$–$C_{18}$, can be used to avoid precipitating out or precipitates of asphaltenes in crude oils and products derived therefrom.

The invention thus relates to crude oils and products derived therefrom, comprising secondary alkanesulfonic acids in which a chain length of 8 to 22 carbon atoms is present as asphaltene-dispersing agent.

Products derived from crude oils are, for example, heavy heating oil, marine oil or bitumen.

The dispersing agents according to the invention are employed in an amount of 1 to 10,000, preferably 2 to 2000 ppm.

The alkanesulfonic acid is preferably formulated as a solution or microemulsion with hydrocarbons, which optionally comprises water and/or an aliphatic alcohol.

In general, the dispersing agent comprises 20–80% by weight, preferably 30–60% by weight, of alkanesulfonic acid, and furthermore 20–80% by weight, preferably 20–70% by weight, of a hydrocarbon or a mixture of a hydrocarbon and a $C_2$–$C_8$-alcohol, and 0–30% by weight of water.

Effective asphaltene-dispersing agents can also be obtained by combining alkanesulfonic acids with other substances, in particular
a) alkylphenol-formaldehyde resins,
b) oxalkylated amines,
c) wax-dispersing agents.

Dispersing agents which are based on a combination of substances may react less sensitively to changed oil compositions: this improves the reliability.

EXAMPLES

The following examples are intended to illustrate the invention in more detail.

Principle of the dispersing test

The dispersing, the precipitating out of asphaltenes depends on the nature of the hydrocarbon medium. Asphaltenes are soluble in aromatic but not in aliphatic hydrocarbons. Dispersing agents can thus be tested by dissolving the oil or extracted asphaltenes in an aromatic solvent and then adding an aliphatic hydrocarbon in order to produce a precipitate. Since asphaltenes are dark in color, the extent of the precipitate can be determined by a calorimetric measurement of the supernatant liquid. The darker the supernatant liquid, the more asphaltenes remain dispersed, i.e. the better the dispersing agent. This test is described in Canadian Patent 20 29 465. In our version of the test, the precipitating medium is chosen such that the asphaltenes precipitate out for the most part, but not completely.

Dispersing test procedure
a) A 25% strength oil solution in toluene is filtered in order to remove impurities;
b) 9.5 ml of heptane, as a precipitating agent for asphaltenes, and 0.5 ml of toluene/dispersing agent mixture (25:1) are initially introduced into a graduated glass tube which holds a good 10 ml, and are shaken vigorously. This corresponds to a dispersing agent concentration of 2000 ppm. The amount of dispersing agent can be varied if required. Pure toluene is used for the blank samples;
c) 0.1 ml of the filtered oil solution is then added to the glass tube and the mixture is likewise shaken vigorously;

d) the entire system is left to stand for 2 hours without vibration. The asphaltenes which have precipitated out should be able to accumulate on the bottom of the tube;
e) after the end of this period, the volume of the sediment is estimated with the aid of the graduation, the appearance of the entire sample is recorded and then 1 ml of the supernatant phase is carefully removed with a pipette;
f) the quantity aspirated out is dissolved in 5 ml of toluene and measured photometrically at 600 nm.

Evaluation of the dispersing test

The following expression is taken as a relative measure of the dispersing action $$A = 100(D-D_0)/D_0,$$

in which D and $D_0$ are the optical densities of the measurement solution and blank sample. The maximum value of A which can be achieved, $A_{max}$, corresponds to complete dispersion of the asphaltenes. It can be estimated by carrying out a test without a dispersing agent and with toluene instead of heptane—the asphaltenes remain completely dispersed as a result.

The volume of the sediment provides further information on the effectiveness of the dispersing agent. The smaller the amount of sediment, the better the substance is dispersed.

Results

The investigations were carried out with a heavy oil which comprised considerable amounts of asphaltenes. The secondary alkanesulfonic acids had an average chain length of 15.5 carbon atoms. The table shows the results of the dispersing test at various concentrations.

|                    | Dispersion effect | |
| ------------------ | ----------------- | ------------- |
| Concentration [ppm] | A                | Sediment (ml) |
| 2000               | 366               | 0.2           |
| 1330               | 326               | 0.3           |
| 670                | 279               | 0.3           |
| 0                  | 0                 | 0.8           |

Under these conditions, the maximum of A, which corresponds to complete dispersion of the asphaltene, would be about 500.

We claim:

1. A product comprising a crude oil, heavy heating oil, marine oil, or bitumen and an effective amount of a secondary alkanesulfonic acid asphaltene-dispersing agent, said dispersing agent having a carbon atom chain length of 8 to 22.

2. The product of claim 1, wherein the alkanesulfonic acid has a carbon atom chain length of 11–18.

3. The product of claim 1, wherein the alkanesulfonic acid is present as a solution or microemulsion with a hydrocarbon.

4. The product of claim 3, wherein the hydrocarbon contains water and/or an aliphatic alcohol.

5. A crude oil as claimed in claim 3, wherein the asphaltene-dispersing agent comprises 20–80% by weight, of an alkanesulfonic acid, 20–80% by weight, of a hydrocarbon or a mixture of a hydrocarbon and a $C_2$–$C_8$-alcohol, and 0–30% by weight of water.

6. The product of claim 1, further comprises an alkylphenol-formaldehyde resin, oxyalkylated amine, wax-dispersing agent or mixtures thereof.

7. A process for dispersing asphaltenes in crude oil heavy heating oil, marine oil, or bitumen which comprises adding a secondary alkanesulfonic acid having a carbon atom chain length of 8 to 22 to the crude oil, heavy heating oil, marine oil, or bitumen in an amount of 1 to 10,000 ppm by volume.

8. The process as claimed in claim 7, further comprising the step of adding an alkylphenol-formaldehyde resin, oxyalkylated amine, wax-dispersing agent or mixture thereof to the crude oil, heavy heating oil, marine oil, or bitumen.

9. The process of claim 7 wherein said amount is from 2 to 2000 ppm by volume.

* * * * *